US011787727B2

(12) United States Patent
Drachenberg et al.

(10) Patent No.: US 11,787,727 B2
(45) Date of Patent: Oct. 17, 2023

(54) METHOD FOR FABRICATION OF SLEEVELESS PHOTONIC CRYSTAL CANES WITH AN ARBITRARY SHAPE

(71) Applicant: LAWRENCE LIVERMORE NATIONAL SECURITY, LLC, Livermore, CA (US)

(72) Inventors: Derrek Reginald Drachenberg, Livermore, CA (US); Michael J. Messerly, Danville, CA (US); Paul H. Pax, Livermore, CA (US); John B. Tassano, Jr., Manteca, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 649 days.

(21) Appl. No.: 15/956,018

(22) Filed: Apr. 18, 2018

(65) Prior Publication Data
US 2019/0322566 A1    Oct. 24, 2019

(51) Int. Cl.
*C03B 37/012*    (2006.01)
*C03B 37/027*    (2006.01)
*C03B 37/03*    (2006.01)

(52) U.S. Cl.
CPC .... *C03B 37/02736* (2013.01); *C03B 37/0122* (2013.01); *C03B 37/01208* (2013.01); *C03B 37/0279* (2013.01); *C03B 37/02781* (2013.01); *C03B 37/03* (2013.01); *C03B 37/032* (2013.01); *C03B 2203/42* (2013.01); *C03B 2205/60* (2013.01)

(58) Field of Classification Search
CPC .......... C03B 37/01208; C03B 37/0122; C03B 37/02736; C03B 2203/42; C03B 37/012; C03B 37/02; C03B 2205/47; C03B 37/027; C03B 2203/47
See application file for complete search history.

(56) References Cited

U.S. PATENT DOCUMENTS 3,262,251 A * 7/1966 Hicks, Jr. .............. C03B 37/027
                                                29/424
3,294,504 A * 12/1966 Hicks, Jr. ................ C03B 37/10
                                                385/115
(Continued)

FOREIGN PATENT DOCUMENTS

CN    1673138 A  *  9/2005 ......... C03B 37/0122
CN    101189540 A  *  5/2008 ........... A61B 1/0011
(Continued)

*Primary Examiner* — Galen H Hauth
*Assistant Examiner* — Steven S Lee
(74) *Attorney, Agent, or Firm* — Eddie E. Scott

(57) ABSTRACT

The fabrication of sleeveless canes utilizes a preform with an array of glass canes in the preform. At least one tube-sleeve encircles the array of glass canes and is secured to the array of glass canes. The array of glass canes is moved into a furnace wherein the array of glass canes is heated. The furnace is maintained at a furnace temperature within the range of 2000° C. to 1700° C. and the array of glass canes is drawn from the furnace. The drawing of the array of glass canes both scales down the glass canes and elongates the glass canes. Maintaining the furnace at a furnace temperature within the range of 2000° C. to 1700° C. assures that the array of glass canes and the glass canes maintain their original shape.

6 Claims, 10 Drawing Sheets

(56) References Cited

U.S. PATENT DOCUMENTS

| | | | | |
|---|---|---|---|---|
| 3,486,868 | A * | 12/1969 | Goodrich | F15C 5/00 65/23 |
| 3,567,549 | A * | 3/1971 | Hoffmeister et al. | C03B 37/14 385/116 |
| 3,622,292 | A * | 11/1971 | Fleck | H01J 9/125 65/409 |
| 3,626,040 | A * | 12/1971 | Nagao | B29C 43/006 264/1.28 |
| 3,679,384 | A * | 7/1972 | Colson | B32B 3/20 428/116 |
| 3,713,729 | A * | 1/1973 | Inoue | C03B 37/14 385/115 |
| 3,759,685 | A * | 9/1973 | Marino | H01S 3/16 65/156 |
| 3,837,824 | A * | 9/1974 | Siegmund | C03B 37/028 65/411 |
| 3,859,071 | A * | 1/1975 | Beasley | C03B 37/15 65/508 |
| 3,904,343 | A * | 9/1975 | Scott, Jr. | H01J 43/246 249/161 |
| 4,101,303 | A * | 7/1978 | Balkwill | C03B 23/207 65/56 |
| 4,329,157 | A * | 5/1982 | Dobo | C03B 37/022 95/56 |
| 4,832,722 | A * | 5/1989 | Henderson | G02B 6/06 216/99 |
| 4,984,859 | A * | 1/1991 | Fujigaki | G02B 6/4439 385/115 |
| 5,045,100 | A * | 9/1991 | Smith | G02B 6/3624 385/95 |
| 5,295,210 | A * | 3/1994 | Nolan | G02B 6/2835 65/409 |
| 5,863,449 | A * | 1/1999 | Grabbe | G02B 6/29368 427/532 |
| 5,879,425 | A * | 3/1999 | Jensen | C03B 37/16 65/393 |
| 5,906,037 | A * | 5/1999 | Elledge | G02B 6/08 264/1.25 |
| 6,349,572 | B1 * | 2/2002 | Meinl | G02B 6/2552 65/410 |
| 6,711,918 | B1 * | 3/2004 | Kliner | C03B 19/106 65/390 |
| 6,888,992 | B2 | 5/2005 | Russell et al. | |
| 7,212,720 | B2 * | 5/2007 | Wied | G02B 6/04 385/115 |
| 7,291,204 | B2 * | 11/2007 | Suzuki | B29C 66/112 210/321.89 |
| 8,041,170 | B2 * | 10/2011 | Taru | G02B 6/02361 385/127 |
| 8,073,299 | B2 * | 12/2011 | Taghizadeh | G02B 5/1847 385/115 |
| 9,423,576 | B2 * | 8/2016 | Bieber | G02B 6/3855 |
| 2003/0056546 | A1 | 5/2003 | Claus et al. | |
| 2004/0151450 | A1 * | 8/2004 | Wadsworth | C03B 37/0124 385/123 |
| 2006/0096325 | A1 * | 5/2006 | Kinoshita | C03B 37/0122 65/393 |
| 2007/0204656 | A1 * | 9/2007 | Gallagher | C03B 37/02781 65/393 |
| 2008/0087303 | A1 * | 4/2008 | Fletcher | B08B 3/04 134/26 |
| 2008/0118212 | A1 * | 5/2008 | Tanaka | A61B 1/0011 65/408 |
| 2009/0218706 | A1 * | 9/2009 | Taru | G02B 6/02361 264/1.28 |
| 2010/0104869 | A1 | 4/2010 | Borrelli et al. | |
| 2014/0360323 | A1 * | 12/2014 | Kendrick | B26D 1/157 83/13 |
| 2015/0274577 | A1 * | 10/2015 | Nakanishi | C03B 37/02754 65/378 |

FOREIGN PATENT DOCUMENTS

| | | | | |
|---|---|---|---|---|
| CN | 202849258 U | * | 4/2013 | C03B 37/0122 |
| DE | 10013482 A1 | * | 9/2001 | C03B 37/01214 |
| GB | 1207814 A | * | 10/1970 | C03B 37/14 |
| GB | 1556046 A | * | 11/1979 | C03B 37/15 |
| GB | 2283105 A | * | 4/1995 | C03B 37/15 |
| JP | S60263906 A | * | 6/1984 | C03B 37/01214 |
| JP | 2001253725 A | * | 9/2001 | C03B 37/01205 |
| JP | 2003313044 A | * | 11/2003 | C03B 37/0122 |
| JP | 2006044950 A | * | 2/2006 | C03B 37/0122 |
| WO | WO-2004001461 A1 | * | 12/2003 | C03B 37/01205 |
| WO | WO-2017080564 A1 | * | 5/2017 | C03B 37/012 |

* cited by examiner

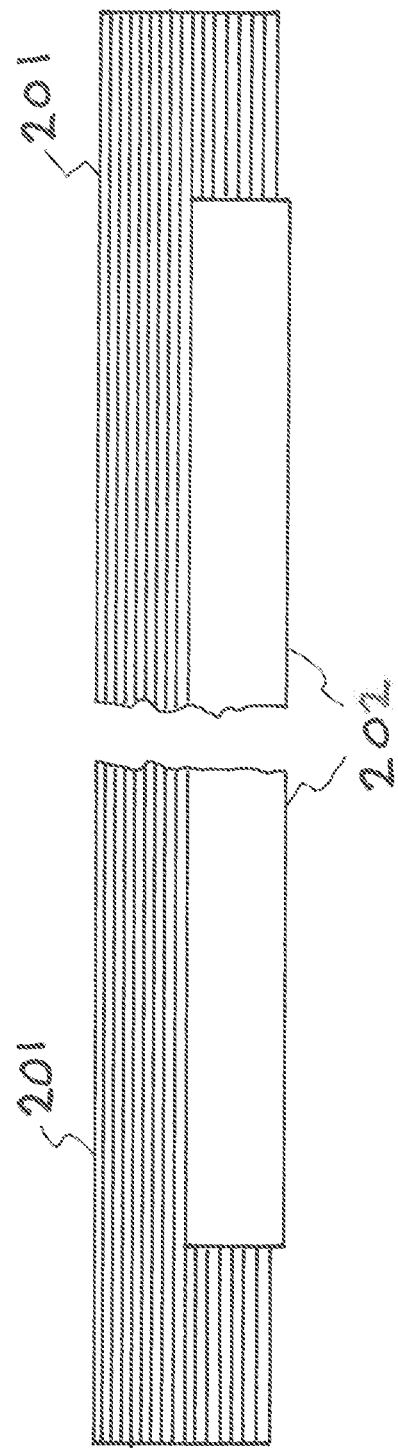

METHOD FOR FABRICATION OF SLEEVELESS PHOTONIC CRYSTAL CANES WITH AN ARBITRARY SHAPE

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to photonic crystal optical fiber canes and more particularly to fabrication of sleeveless photonic crystal canes with an arbitrary shape.

State of Technology

This section provides background information related to the present disclosure which is not necessarily prior art.

Mircrostructured and holey (photonic crystal) fibers are usually drawn from a cane preform assembled from a bundle of glass rods or capillaries held together by a glass sleeve. This conventional method limits the cross-sectional shape of the preforms making them difficult to stack into more complex arrangements. If the sleeve can be dispensed then arbitrary shaped preforms can be fabricated, e.g. stackable hexagonal shapes.

Photonic crystal fibers are typically fabricated by stacking into a pre-form a set of glass canes and/or capillaries which may also be doped to increase or decrease the refractive index of the glass. The pre-form is then stuffed into an outer tube and drawn into optical fiber though an optical fiber draw tower furnace. The complexity of designs that can be achieved with this method in part depends on the number of canes that can be plausibly stacked. The full size of the stack is limited by the diameter of the largest outer tube that can fit into a given fiber draw tower furnace. For this reason, smaller canes are desired so that a greater number of features may be included. Smaller canes, however, are more susceptible to bending out of place and crossing over other canes during stacking. So, there is a practical limit to how many canes, and therefore features, can be included in a single draw for a given furnace.

A possible method to increase the number of features in a photonic crystal fiber is to draw photonic crystal canes from the original pre-form which would then be stacked into a new, more complex, photonic crystal pre-form. This second pre-form would have greatly reduced feature sizes, and therefore greatly increased complexity over the original. A major drawback of this method is that each cane that is drawn from the original pre-form has an outer tube that gets drawn into canes along with the desired photonic crystal structure. This outer sleeve creates a glass barrier between the features of each cane when stacked into a new, more complex preform. This results in reduced fill factor and a loss in control of the features of the final photonic crystal fiber. Drawing sleeveless photonic crystal canes to stack into new photonic crystal pre-forms is a major step toward very high complexity photonic crystal fibers.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors' apparatus, systems, and methods utilize a set of glass canes, doped or un-doped, stacked into a pre-form. The pre-form can be hexagonal, triangular, rectangular, semicircular, or of other shape. A piece of outer tube (tube-sleeve) which is much shorter than the preform, but longer than the "hot zone" of a draw tower furnace, is placed around the pre-form on either end (or both ends) and crimped to the preform near the outer edge. A photonic crystal fiber pre-form now exists in which the two ends of the pre-form have outer tubes holding the shape of the photonic crystal stack, while the central region of the preform is sleeveless, and takes the shape of the photonic crystal stack which in one embodiment is show as hexagonal; however, the shape may be arbitrary.

In one or more embodiments a sleeveless photonic crystal optical fiber cane is fabricated. Sleeveless photonic crystal canes can be used as parts to stack a full fill factor photonic crystal fiber pre-form with greatly increased complexity over what would otherwise be possible. The outer shape of the photonic crystal cane can be arbitrary because there is no need for an outer tube or sleeve to hold the photonic crystal structure. According to one or more embodiments of the inventors' apparatus, systems, and methods, a set of glass canes, doped or un-doped, are stacked into a pre-form. A piece of outer tube which is much shorter than the pre-form, but longer than the "hot zone" of a draw tower furnace, is placed around the pre-form on either end, and crimped to the preform near the outer edge. A photonic crystal fiber pre-form now exists in which the two ends of the pre-form have outer tubes holding the shape of the photonic crystal stack, while the central region of the preform is sleeveless, and takes the shape of the photonic crystal stack which need not be hexagonal and may be arbitrary. The photonic crystal pre-form is then lowered into a draw tower furnace where a portion of preform including the lower tube is melted and dropped off. The remainder of the lower tube initially forces the preform to keep its shape through the hot zone of the furnace while canes are pulled out of the furnace from below. The lower outer tube which is much shorter than the full length pre-form is slowly lowered through the furnace, and only the sleeveless photonic crystal structure continues into the furnace. The result of the above method is that the final canes pulled out of the furnace maintain the shape of the photonic crystal structure but are simply reduced in size without the need for a tube. This allows the resulting canes to be re-stacked into a new photonic crystal structure with full fill factor and no tube barrier between each cane. Some of the advantages of the inventors' apparatus, systems, and methods are:

"final canes pulled out of the furnace maintain the shape of the photonic crystal structure, but are simply reduced in size without the need for a tube";

"allows the resulting canes to be re-stacked into a new photonic crystal structure with full fill factor and no tube barrier between each cane";

"enables realization of much more complex microstructured and holey fiber designs";

"process works for any arbitrary preform shape, e.g. non-circular fibers desired for azimuthal cladding mode suppression in double clad fiber lasers".

The inventors' apparatus, systems, and methods have many uses. A report published by Allied Market Research titled, "Photonic Crystal Market by Type, Applications, and End User: Global Opportunity Analysis and Industry Forecast, 2014-2022," the global photonic crystal market was valued at $348 million in 2015, and is projected to reach $608 million by 2022, growing at a CAGR of 8.0% from 2016 to 2022. Optical fiber application segment generated the highest revenue in 2015, with almost one-fourth of the total market share, followed by LED segment. Optical fiber-based photonic crystals offer much greater control over light and design freedom to achieve variety of peculiar properties.

The inventor's apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 2A and 2B illustrate a set of glass canes, doped or un-doped, stacked into a pre-form.

DETAILED DESCRIPTION OF SPECIFIC EMBODIMENTS

Figure 1A:
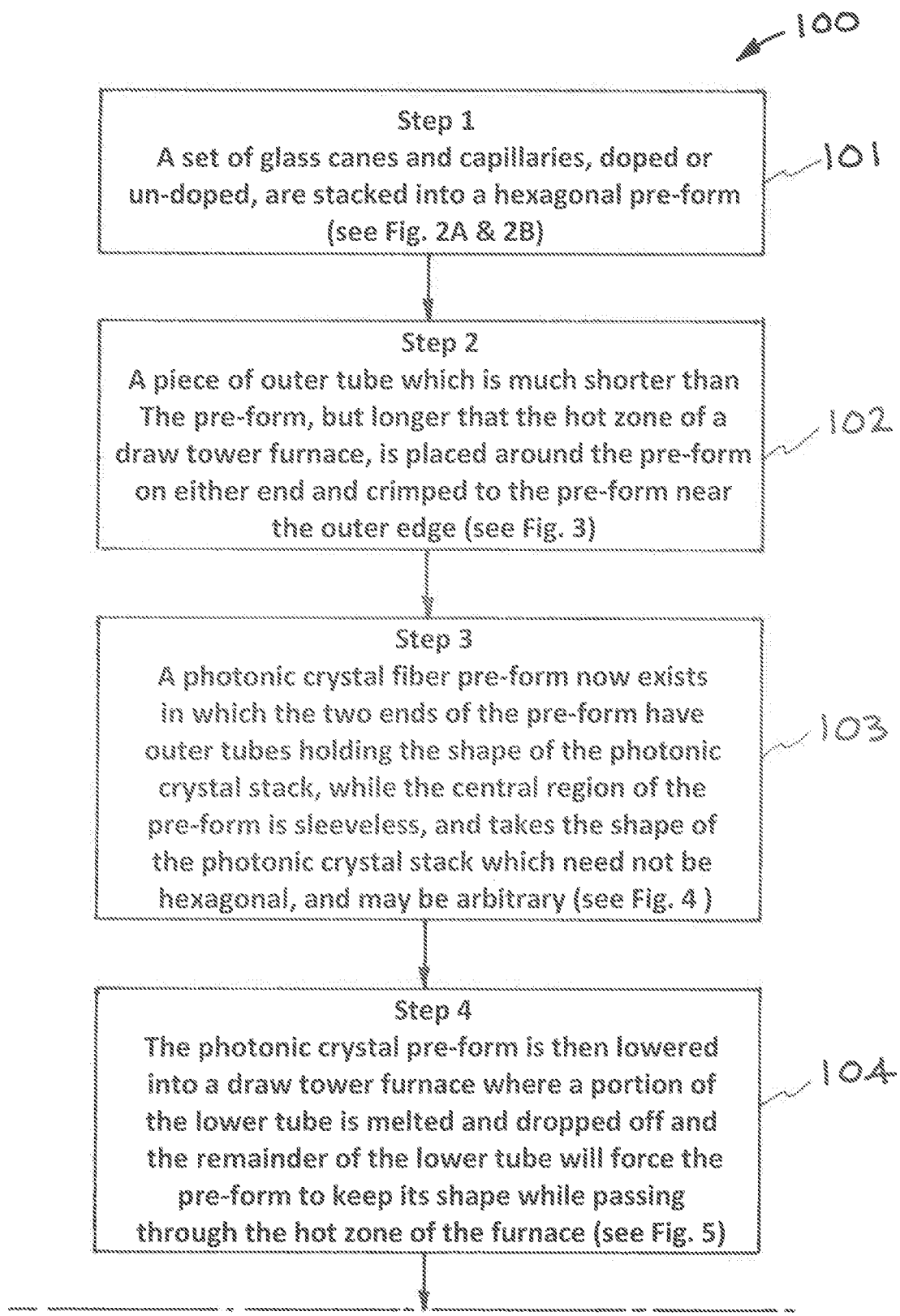
FIGS. 1A and 1B, provide a flow chart that illustrates one embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 1B:
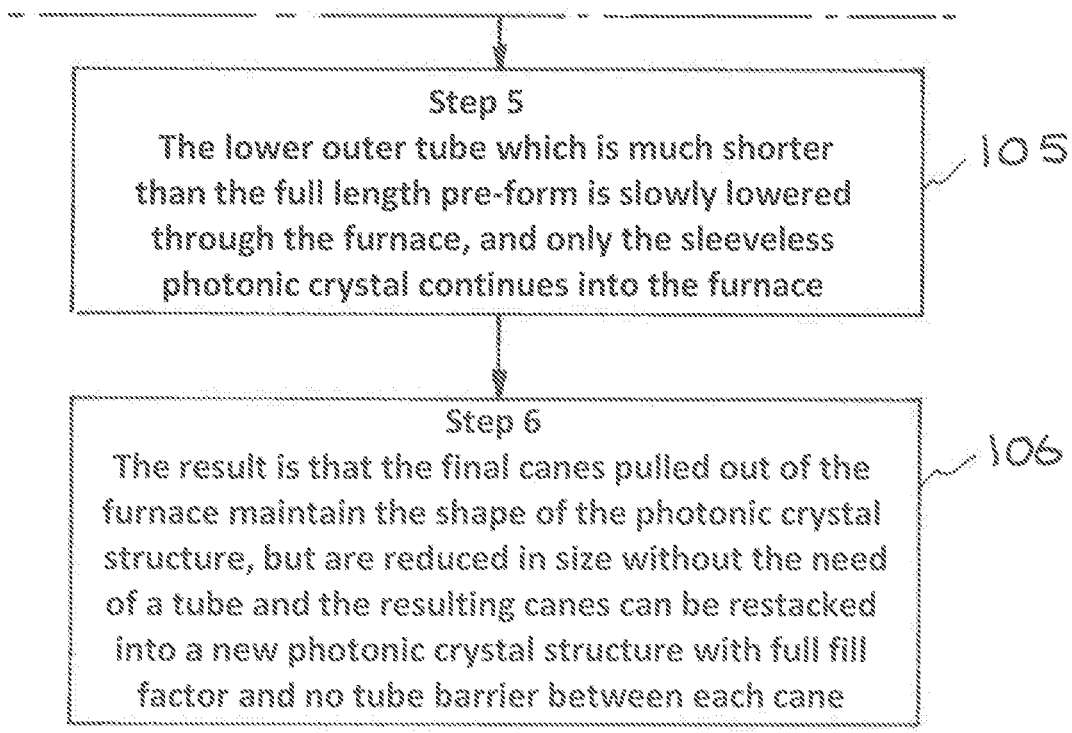
Figure 2A:
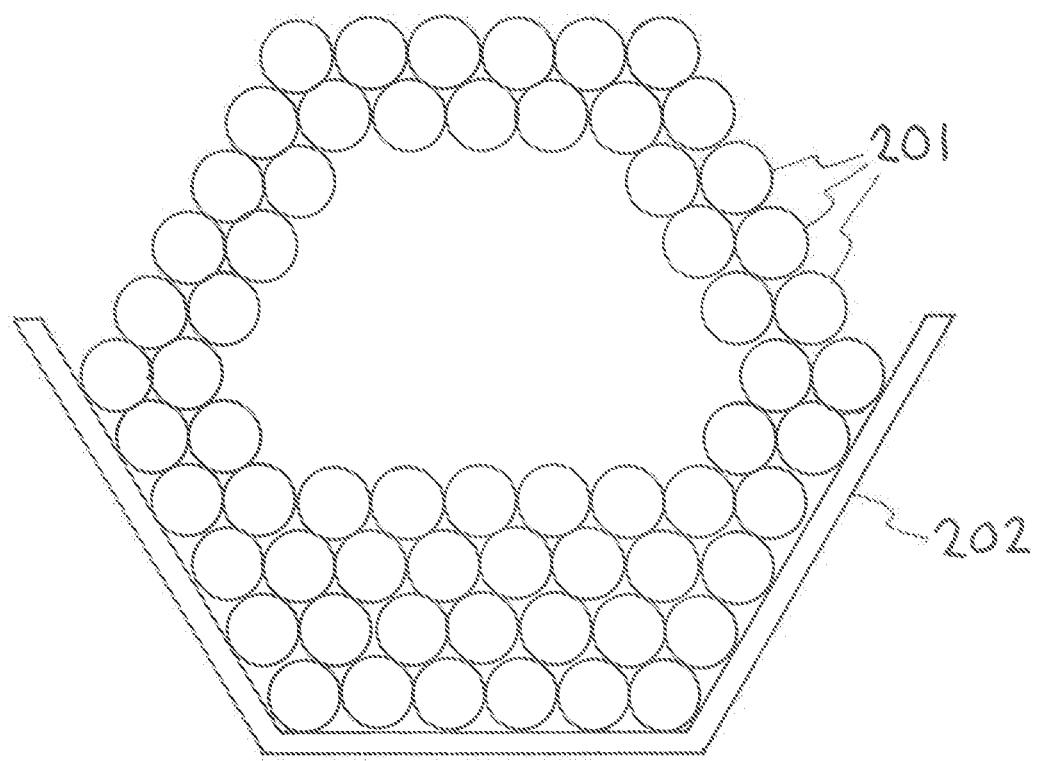
Figure 3:
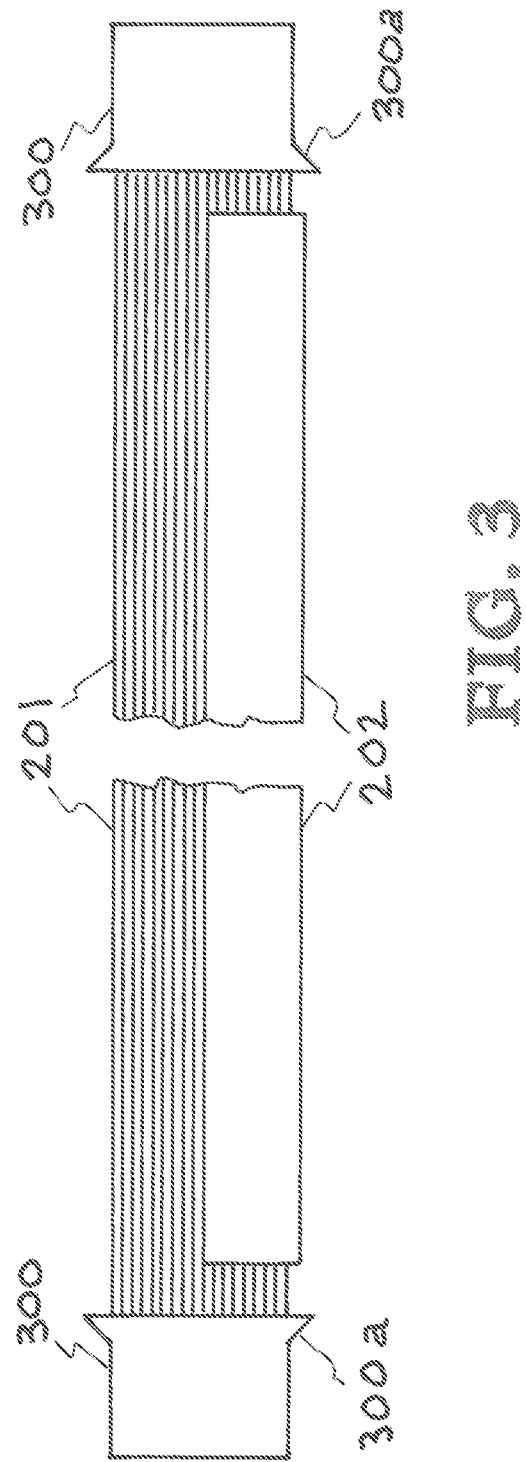
FIG. 3. shows a piece of outer tube (tube-sleeve) placed around at least one end of the glass canes in the pre-form wherein the tube-sleeve is much shorter than the pre-form, but longer that the hot zone of a draw tower furnace.
Figure 4:
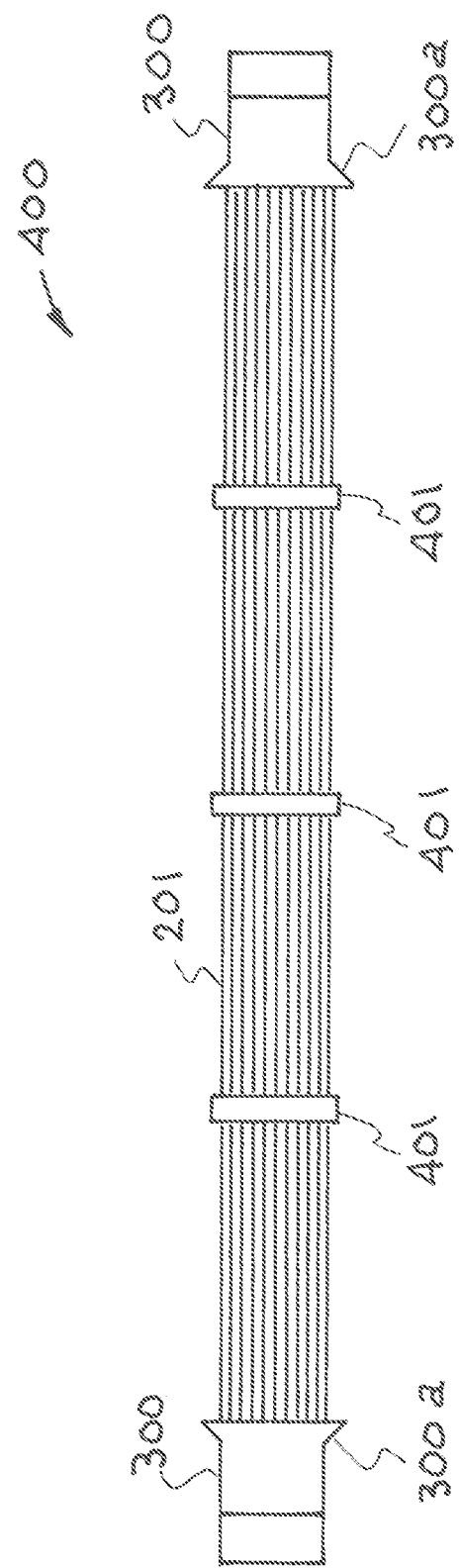
FIG. 4. shows the outer tubes (tube-sleeves) placed around the glass canes and crimped to the glass canes near their outer edge.
Figure 5:
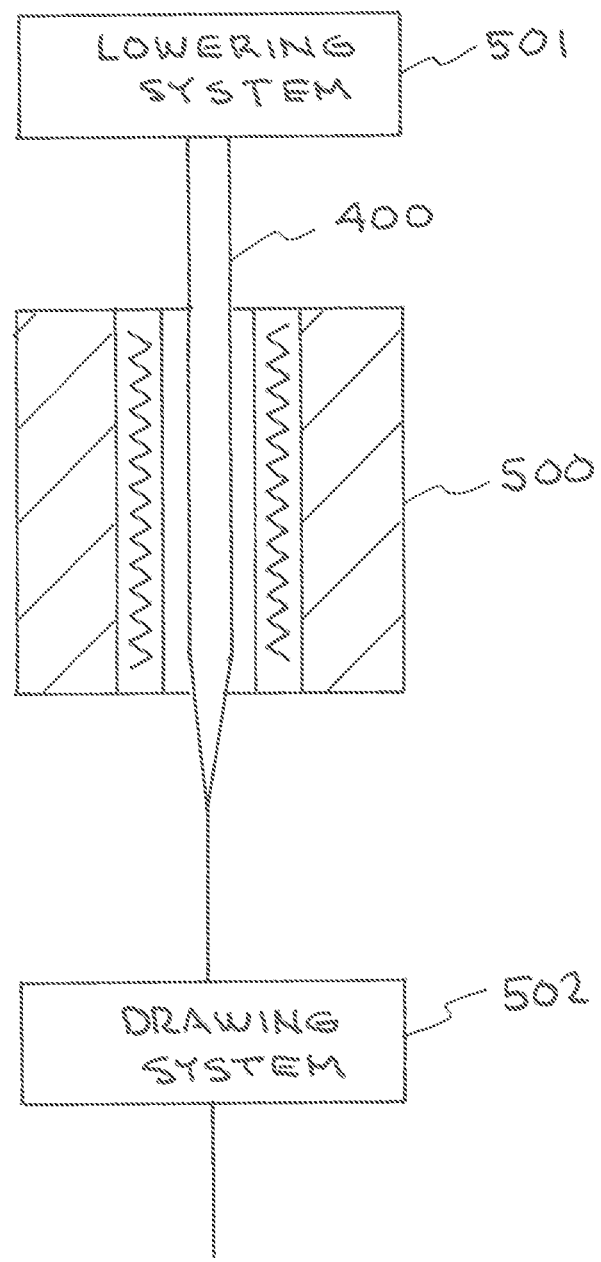
FIG. 5. illustrates the photonic crystal fiber pre-form being slowly lowered through a furnace.

Referring now to the drawings and in particular to FIGS. 1A and 1B, a flow chart illustrates one illustrative embodiment of the inventor's apparatus, systems, and methods. This embodiment is designated generally by the reference numeral 100. The flow chart presented in FIGS. 1A and 1B sets out six (6) steps of the embodiment 100 of the inventor's inventors' apparatus, systems, and methods. Specific individual steps include reference to subsequent drawing figures that provide additional information about the step. The embodiment 100 includes the following steps:

Step #1 (101)—a set of glass canes, doped or un-doped, are stacked into a pre-form as illustrated in FIGS. 2A and 2B;

Step #2 (102)—a piece of outer tube (tube-sleeve) which is much shorter than the pre-form, but longer that the hot zone of a draw tower furnace, is placed around the pre-form on at least one end and crimped to the pre-form near the outer edge, two tube sleeves are illustrated in FIG. 3 with a tube sleeve on each end of the pre-form;

Step #3 (103)—a photonic crystal fiber pre-form now exists in which the two ends of the pre-form have outer tubes (tube-sleeves) holding the shape of the photonic crystal stack, while the central region of the pre-form is sleeveless, and takes the shape of the photonic crystal stack which need not be hexagonal, and may be arbitrary as illustrated in FIG. 4;

Step #5 (105)—the lower outer tube which is much shorter than the full length pre-form is slowly lowered through the furnace, and only the sleeveless photonic crystal continues into the furnace as illustrated in FIG. 5; and Step #6 (106)—the result is that the final canes pulled out of the furnace maintain the shape of the photonic crystal structure but are reduced in size without the need of a tube and the resulting canes can be restacked into a new photonic crystal structure with full fill factor and no tube barrier between each cane.

Referring now to FIGS. 2A and 2B, a set of glass canes 201, doped or un-doped, are shown stacked into a one half hexagon shaped pre-form 202. FIG. 2A is an end view and FIG. 2B is a side view of the glass canes 201 and the one half hexagon shaped pre-form 202. FIG. 1A shows the glass canes 201 stacked in the one half hexagon shaped pre-form 202. In a preferred arrangement as illustrated in FIG. 1B, the glass canes 201 are longer than the one half hexagon shaped pre-form 202 and the ends of the glass canes 201 protrude from the one half hexagon shaped pre-form 202.

Referring now to FIG. 3, a piece of outer tube (tube-sleeve) 300 which is much shorter than the pre-form 202, but longer that the hot zone of a draw tower furnace, is placed around at least one end of the glass canes 201 in the pre-form 202. FIG. 3 illustrates a preferred embodiment wherein a piece of outer tube (tube-sleeve) 300 is place on both ends of the glass canes and crimped to the glass canes 201 near their outer edge. The end of outer tube (tube-sleeve) 300 includes a tube flared portion 300a in the opening that enables the outer tube (tube-sleeve) 300 to be easily place over the glass canes 201. On one side of the pre-form, the side which will be lowered first into the furnace, henceforth referred to as the lower end, the outer tube (tube-sleeve) 300 should be placed at the absolute end of the pre-form so than no more of the pre-form than necessary is lost during the initial glass melting. On the opposite side of the pre-form, henceforth referred to as the upper end, the 2nd outer tube (tube-sleeve) 300 should be placed such that the end of the tube rests 1-2" from the end of the pre-form leaving a small section of pre-form sticking out from the tube to add a handle to.

Referring now to FIG. 4, the outer tubes (tube-sleeves) 300 have been placed around the glass canes 201 and crimped to the glass canes 201 near their outer edge. A photonic crystal fiber pre-form 400 now exists in which the two ends of the pre-form have outer tubes (tube-sleeves) 300 holding the shape of the photonic crystal stack, while the central region of the pre-form is sleeveless, and takes the shape of the photonic crystal stack. Pieces 401 of tape are wrapped around the photonic crystal fiber pre-form 400 and maintained there temporarily while handling of the photonic crystal fiber pre-form 400.

Referring now to FIG. 5, an illustration shows the photonic crystal fiber pre-form 400 being slowly lowered through a furnace 500 by a lowering system 501. The pieces 401 of tape have been removed. The bottom outer tube (tube-sleeve) 300 can be removed or the bottom outer tube (tube-sleeve) 300 can be left on the photonic crystal fiber preform 400 and it will be disposed of in the furnace 500. Only the full length glass canes 201 continue into the furnace 500. The furnace 500 heats the glass canes 201 allowing them to be drawn. The drawing will both (1) scale down the cross-section and (2) elongate the structure of the glass canes 201. The drawing system 502 pulls the glass canes 201 from the furnace 500 and they are collected. In summary, the result is that the final canes are pulled out of the furnace and maintain the shape of the photonic crystal structure but are reduced in size without the need of a tube and the resulting canes can be restacked into a new photonic crystal structure with full fill factor and no tube barrier between each cane.

Figure 6:
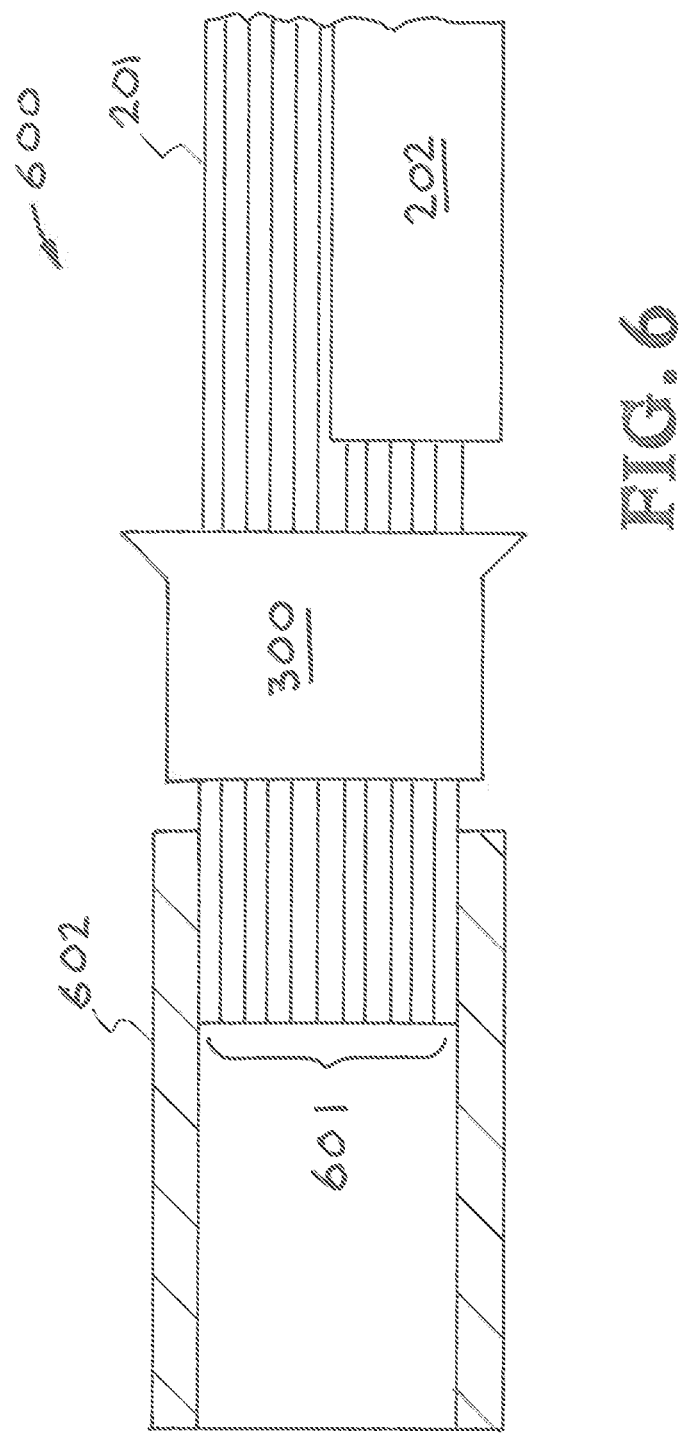
FIG. 6. shows a handle place over a small section of tube-sleeve.

Referring now to FIG. 6, a preferred embodiment 600 is illustrated wherein the upper end of the tube (tube-sleeve) 300 has been placed such that the end of the tube rests 1-2" from the end of the pre-form leaving a small section 601 of pre-form sticking out from the tube (tube-sleeve) 300. A handle 602 is place over the small section 601 of tube-sleeve 300. The handle 602 provides greater ease in handling the photonic crystal fiber pre-form.

Figure 7A:
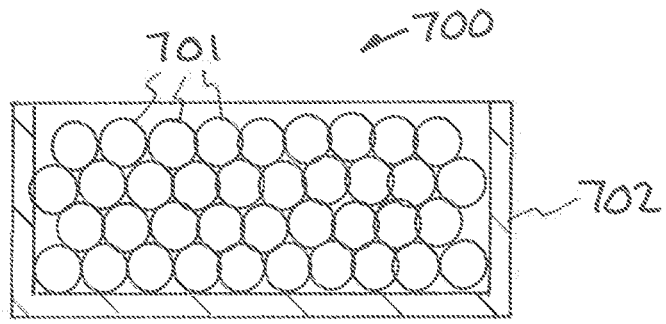
FIGS. 7A and 7B show an end view of the glass canes in a rectangular pre-form and the photonic crystal stack of glass canes having a rectangular cross section shape.
Figure 7B:
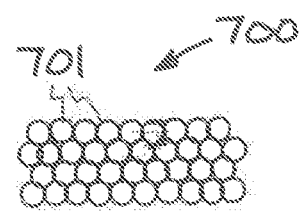

Referring now to FIGS. 7A and 7B, another embodiment of the inventor's apparatus, systems, and methods is illustrated. This embodiment is designated generally by the reference numeral 700. FIG. 7A is an end view of the glass canes 701 in a rectangular pre-form 702. FIG. 7A is an illustration showing the glass canes 701 stacked in the rectangular pre-form 702. FIG. 7B is an illustration showing the glass canes 701 after they have emerged from the furnace. The photonic crystal stack of glass canes 701 has a rectangular cross section shape.

Figure 8A:
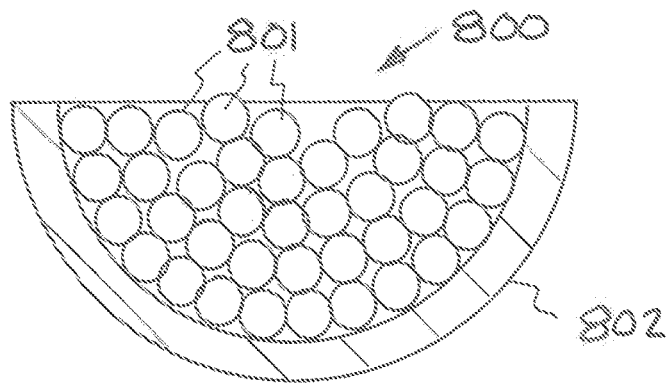
FIGS. 8A and 8B show an end view of the glass canes in a semicircular pre-form and the photonic crystal stack of glass canes having a semicircular cross section shape.
Figure 8B:

Referring now to FIGS. 8A and 8B, another embodiment of the inventor's apparatus, systems, and methods is illustrated. This embodiment is designated generally by the reference numeral 800. FIG. 8A is an end view of the glass canes 801 in a semicircular pre-form 802. FIG. 8A is an illustration showing the glass canes 801 stacked in the semicircular pre-form 802. FIG. 8B is an illustration showing the glass canes 801 after they have emerged from the furnace. The photonic crystal stack of glass canes 801 has a semicircular cross section shape.

Figure 9A:
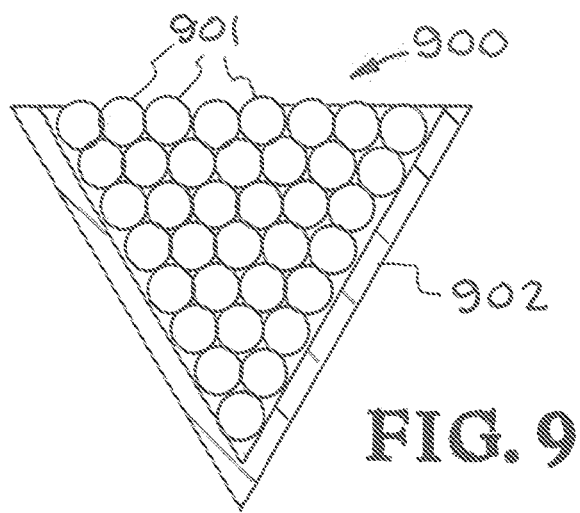
FIGS. 9A and 9B show an end view of the glass canes in a triangular pre-form and the photonic crystal stack of glass canes having a triangular cross section shape.
Figure 9B:
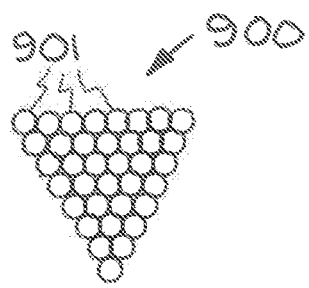

Referring now to FIGS. 9A and 9B, another embodiment of the inventor's apparatus, systems, and methods is illustrated. This embodiment is designated generally by the reference numeral 900. FIG. 9A is an end view of the glass canes 901 in a triangular pre-form 902. FIG. 9A is an illustration showing the glass canes 901 stacked in the triangular pre-form 902. FIG. 9B is an illustration showing the glass canes 901 after they have emerged from the furnace. The photonic crystal stack of glass canes 901 has a triangular cross section shape.

Figure 10:
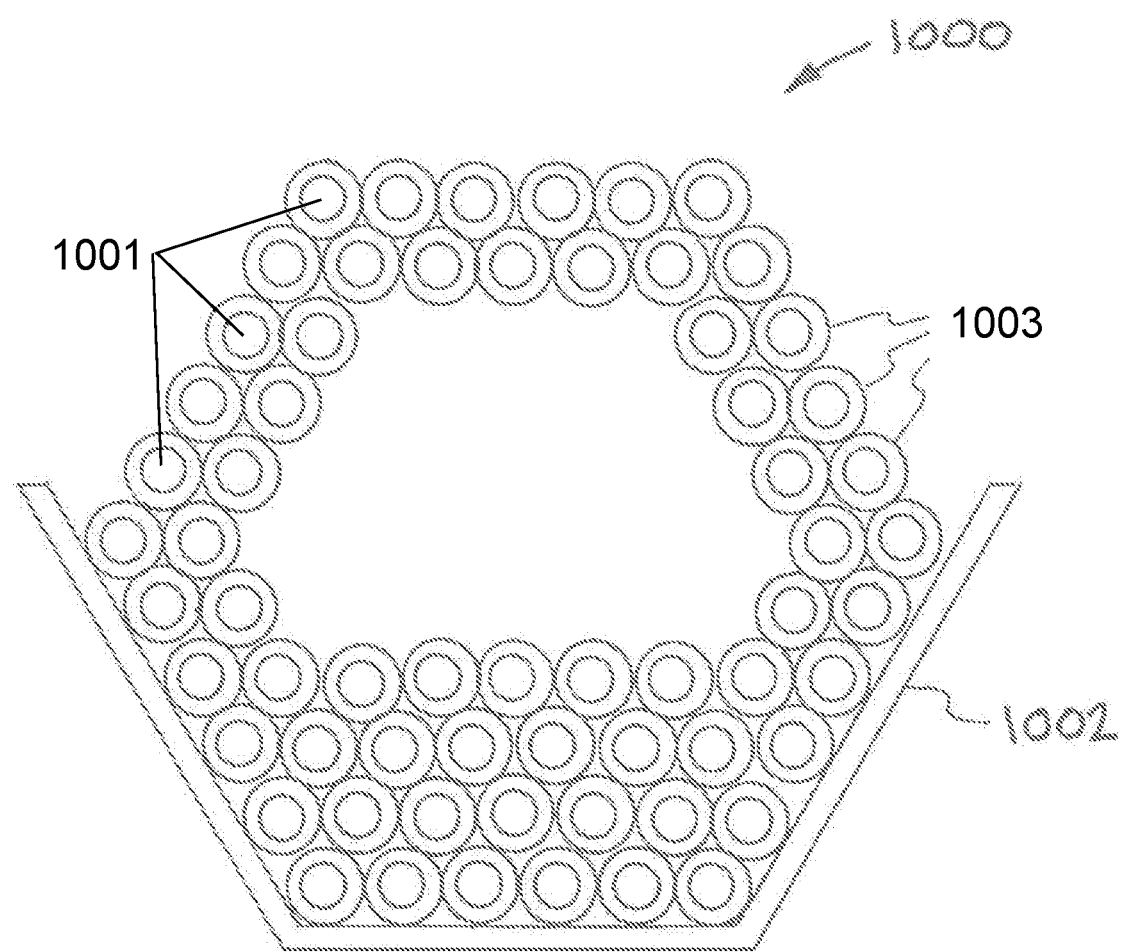
FIG. 10 shows an end view of glass canes in a pre-form wherein the glass canes including capillaries.

Referring now to FIG. 10 an end view of glass canes 1001 in a one half hexagon shaped pre-form 1002 is illustrated. A portion of the glass canes 1001 include capillaries 1003 that extend the entire length of the glass canes 1001. The canes 1001 are lowered into a furnace. The furnace heats the glass canes allowing them to be drawn. The drawing will both (1) scale down the cross-section and (2) elongate the structure of the glass canes. A drawing system pulls the glass canes from the furnace, and they are collected. The resulting canes can be restacked into a new photonic crystal structure with full fill factor and no tube barrier between each cane.

The allow fabrication of sleeveless photonic crystal canes with an arbitrary shape. One purpose of these sleeveless photonic crystal canes is for re-stacking into a new photonic crystal pre-form which could have significantly greater complexity than a pre-form built from featureless round canes. The inventors' apparatus, systems, and methods will be further described and illustrated as set out in the drawings summarized in the brief description of drawings.

The inventors' apparatus, systems, and methods in various embodiments provide a system in which a sleeveless photonic crystal optical fiber cane can be fabricated. Sleeveless photonic crystal canes can be used as parts to stack a full fill factor photonic crystal fiber pre-form with greatly increased complexity over what would otherwise be possible. The outer shape of the photonic crystal cane can be arbitrary because there is no need for an outer tube or sleeve to hold the photonic crystal structure.

According to one embodiment of the inventors' apparatus, systems, and methods, a set of glass canes and capillaries, doped or un-doped, are stacked into a pre-form. A piece of outer tube which is much shorter than the pre-form, but longer than the "hot zone" of a draw tower furnace, is placed around the pre-form on either end, and crimped to the preform near the outer edge. A photonic crystal fiber pre-form now exists in which the two ends of the pre-form have outer tubes holding the shape of the photonic crystal stack, while the central region of the preform is sleeveless, and takes the shape of the photonic crystal stack which need not be hexagonal and may be arbitrary. The photonic crystal pre-form is then lowered into a draw tower furnace where a portion of the lower tube is melted and dropped off. The remainder of the lower tube initially forces the preform to keep its shape through the hot zone of the furnace while canes are pulled out of the furnace from below. The lower outer tube which is much shorter than the full length pre-form is slowly lowered through the furnace, and only the sleeveless photonic crystal structure continues into the furnace. The result of the inventors' apparatus, systems, and methods is that the final canes pulled out of the furnace maintain the shape of the photonic crystal structure but are simply reduced in size without the need for a tube. This allows the resulting canes to be re-stacked into a new photonic crystal structure with full fill factor and no tube barrier between each cane.

Initially a set of canes and capillaries are stacked into a hexagonal photonic crystal stack. A pair of outer tubes, which are much shorter than the full length stack but longer than the "hot zone" of the furnace, are then placed on either end of the preform. The pair of outer tubes should be pre-pared before placing them on the ends of the pre-form by flaring out one edge to have a slightly larger diameter than the rest of the tube. When the tubes are installed onto each end of the pre-form, the flared end should go toward the center of the pre-form. This prevents the tube from scratching any of the pre-form canes during installation which could result in broken canes during the draw. In the case that the internal cross-section of the tube is not the same shape as the photonic crystal stack, a set of short canes are stuffed into the spaces between the hexagonal photonic crystal stack and the outer tube's inner wall.

On one side of the pre-form, the side which will be lowered first into the furnace, henceforth referred to as the lower end, the outer tube should be placed at the absolute end of the pre-form so than no more of the pre-form than necessary is lost during the initial glass melting. On the opposite side of the pre-form, henceforth referred to as the upper end, the 2nd outer tube should be placed such that the end of the tube rests 1-2" from the end of the pre-form leaving a small section of pre-form sticking out from the tube to add a handle to.

At this stage, the photonic crystal stack can be transformed into a nearly arbitrary shape by replacing a subset of the long photonic crystal canes each with two shorter pieces. This is accomplished by pushing a short length of cane into one end of the preform which forces a full length piece to begin exiting the opposite end. Once the full length cane has been pushed through the first outer tube, it should be pulled from the opposite side until the remaining length is just enough to fill the $2^{nd}$ outer tube, then the excess is cut off. This process is repeated with any desired cane or capillary in the originally hexagonal preform until the desired outer shape is achieved.

The outer tubes are then crimped down onto the enclosed stack by use of a glass-working lathe. The crimp-locations should be as near the outer edge as possible. This step ensures that the desired shape of the photonic crystal stacked is held in place on each end without the need for the tube to enclose the entire length of the pre-form.

If desired, a handle can be added to the upper end of the preform to increase yield. A handle in this case would be a length of tube which has the same cross-section as the upper tube which would be crimped onto the upper end of the preform sticking out from the upper tube. This allows the pre-form to be lowered inside the furnace, so the entire stack can be drawn into canes.

Before drawing photonic crystal canes, it is beneficial to add high temperature tape (a type which leaves no residue such as Teflon) which surrounds the sleeveless section of the pre-form at various locations along the length. This tape should be removed as its segment of the pre-form approaches the furnace entrance. The purpose of this tape is to further support the shape of the sleeveless section of the pre-form during the draw, as well as to prevent any individual canes from falling into the furnace should it break near the top. This step is optional and should not be necessary with proper handling of the pre-form but is a beneficial safeguard.

The pre-form is then lowered into the furnace, held by the handle attached to the upper end of the pre-form such that the location of the crimp is just below the "hot zone" of the furnace. The furnace temperature is then raised to the "drop" temperature, 2050° C. in our case. The heat from the furnace should be acting on a portion of the preform which has an outer tube holding the preform in shape. This outer tube begins to shrink inward during melting, which ultimately fuses all the preform parts together eliminating the need for a lower crimp even as the crimp drops out of the furnace.

A small portion of glass that was below the hot zone drops out of the furnace, and is cut off, leaving a narrow neck of fused glass hanging out of the furnace. This neck is pulled at a fixed rate out of the furnace as the pre-form is lowered into the furnace at a fixed rate, and the furnace temperature is dropped to the draw temperature. At this point in the process, the photonic crystal canes being pulled out of the furnace have an outer sleeve just like traditionally fabricated photonic crystal canes. However, after the pre-form is lowered sufficiently into the furnace, the portion of the pre-form which was sleeved by an outer tube is lowered completely through the hot zone, and pulled out of the furnace, leaving only the sleeveless photonic crystal stack. The drawings summarized in the brief description of drawings show the pre-form after drawing with the attached handle at the top, followed by the upper tube, the sleeveless pre-form section, and the neck down region where the cross-sectional area of the photonic crystal stack is reduced without changing shape.

In the prior art the canes and especially capillaries would shrink and blend together losing some of the originally intended shape. For this reason, the furnace temperature is lowered to 1880° C.±20° C. to lower the viscosity in the hot zone. This results in the output canes maintaining the shape of the photonic crystal pre-form stack.

At this point m the process, the canes which are drawn out of the furnace are sleeveless photonic crystal canes which can be stacked into new photonic crystal pre-forms. The features of the original pre-form and therefore resulting canes can vary widely in material, and shape, and may or may not contain capillaries to form air-holes in the final cane. Other materials can be used with this same process and may require various temperatures which depending on the melting temperature of the particular material being used.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather; the application is to cover all modifications, equivalents, and alternatives falling within the spirit and scope of the application as defined by the following appended claims.

The invention claimed is:

1. A method of fabricating glass canes, comprising the steps of:
   providing a pre-form that is one half of a hexagon;
   stacking an array of glass canes in said pre-form, wherein said glass canes have a cane length and wherein said array of glass canes has a first array end and a second array end opposite said first array end and wherein said first array end has an absolute first array end;
   providing a first outer tube tube-sleeve, wherein said first outer tube tube-sleeve has a first outer tube tube-sleeve length that is shorter than said cane length;
   providing a second outer tube tube-sleeve, wherein said second outer tube tube-sleeve has a second outer tube tube-sleeve length that is shorter than said cane length;
   positioning said first outer tube tube-sleeve and said second outer tube-tube-sleeve on said array of glass canes, wherein said step of positioning said first outer tube tube-sleeve and said second outer tube tube-sleeve on said array of glass canes comprises
   placing said first outer tube tube-sleeve on said first array end at said absolute first array end of said first array end;
   crimping said first outer tube tube-sleeve onto said first array end of said array of glass canes at said absolute first array end of said first array end;
   placing said second outer tube-sleeve on said second array end;
   crimping said second outer tube tube-sleeve onto said second array end of said array of glass canes;
   after crimping said first outer tube tube-sleeve onto said first array end and after crimping said second outer tube tube-sleeve onto said second array end, moving said array of glass canes into a furnace, wherein said array of glass canes is heated; and
   drawing said array of glass canes from said furnace, wherein said drawing said array of glass canes scales down and elongates said glass canes;
   wherein said step of stacking an array of glass canes comprises stacking an array of hollow glass canes into a stack of hollow glass canes and wherein said stack of hollow glass canes are not fluid tight,
   wherein said step of crimping said first outer tube tube-sleeve onto said first array end of said array of glass canes at said absolute first array end of said first array end does not provide a fluid tight seal, and
   wherein said step of crimping said second outer tube tube-sleeve onto said second array end of said array of glass canes at said absolute first array end of said second array end does not provide a fluid tight seal.

2. The method of fabricating glass canes of claim 1, further comprising the steps of
   providing a first flared portion on said first outer tube tube-sleeve to enable said first outer tube to be placed on said first array end, and
   providing a second flared portion on said second outer tube tube-sleeve to enable said second outer tube to be placed on said second array end.

3. The method of fabricating glass canes of claim 1, further comprising the step of applying a polytetrafluoroethylene tape to said array of glass canes and support the shape of the sleeveless section as well as to prevent any individual canes from falling into the furnace.

4. The method of fabricating glass canes of claim 1, wherein said step of stacking an array of glass canes comprises stacking an array of hollow glass canes.

5. The method of fabricating glass canes of claim 1, further comprising the step of providing a flared end only on said first outer tube tube-sleeve.

6. A method of fabricating glass canes, comprising the steps of:
   providing a pre-form that is one half of a hexagon;
   stacking an array of glass canes in said pre-form, wherein said array of glass canes in said pre-form and said glass canes have a shape and a cane length and wherein said array of glass canes has a first array end and a second array end opposite said first array end and wherein said first array end has an absolute first array end;
   providing a first outer tube tube-sleeve;
   providing a first flared end on said first outer tube tube-sleeve;
   placing said first outer tube tube-sleeve on said first array end;
   crimping said first outer tube tube-sleeve onto said first array end of said array of glass canes;
   providing a second outer tube tube-sleeve;
   providing a second flared end on said first outer tube tube-sleeve;

placing said second outer tube tube-sleeve on said second array end at said absolute first array end of said first array end;

crimping said second outer tube tube-sleeve onto said second array end at said absolute first array end of said first array end of said array of glass canes;

after crimping said first outer tube tube-sleeve onto said first array end and after crimping said second outer tube tube-sleeve onto said second array end, moving said array of glass canes into a furnace to heat said glass canes;

maintaining said furnace at a furnace temperature within the range of 2000° C. to 1700° C. to heat said array of glass canes and said glass canes, wherein said array of glass canes and said glass canes maintain said shape; and drawing said array of glass canes from said furnace, wherein said drawing said array of glass canes scales down and elongates said glass canes, wherein said step of stacking an array of glass canes comprises stacking an array of hollow glass canes into a stack of hollow glass canes and wherein said stack of hollow glass canes are not fluid tight, wherein said step of crimping said first outer tube tube-sleeve onto said first array end of said array of glass canes at said absolute first array end of said first array end does not provide a fluid tight seal, and wherein said step of crimping said second outer tube tube-sleeve onto said second array end of said array of glass canes at said absolute first array end of said second array end does not provide a fluid tight seal.

* * * * *